(12) United States Patent
Trofimuk et al.

(10) Patent No.: US 12,435,022 B2
(45) Date of Patent: Oct. 7, 2025

(54) PROCESS FOR RECOVERY OF HYDRATE INHIBITORS

(71) Applicant: VME Canada LTD., Calgary (CA)

(72) Inventors: Terrance John Larry Trofimuk, Calgary (CA); Daniel John Domanko, Calgary (CA)

(73) Assignee: VME Canada LTD., Calgary (CA)

( * ) Notice: Subject to any disclaimer, the term of this patent is extended or adjusted under 35 U.S.C. 154(b) by 916 days.

(21) Appl. No.: 17/623,191

(22) PCT Filed: Jun. 12, 2020

(86) PCT No.: PCT/CA2020/050812
§ 371 (c)(1),
(2) Date: Dec. 27, 2021

(87) PCT Pub. No.: WO2020/248066
PCT Pub. Date: Dec. 17, 2020

(65) Prior Publication Data
US 2022/0356136 A1 Nov. 10, 2022

Related U.S. Application Data

(60) Provisional application No. 62/861,568, filed on Jun. 14, 2019.

(51) Int. Cl.
*C07C 29/76* (2006.01)
*B01D 3/06* (2006.01)
(Continued)

(52) U.S. Cl.
CPC ............... *C07C 29/76* (2013.01); *B01D 3/06* (2013.01); *B01D 3/103* (2013.01); *B01D 3/143* (2013.01);
(Continued)

(58) Field of Classification Search
CPC ...... C07C 29/76–92; C07C 29/84; B01D 3/06; B01D 3/103; B01D 3/143; B01D 61/422;
(Continued)

(56) References Cited

U.S. PATENT DOCUMENTS 5,817,889 A 10/1998 Pondebat et al.
2005/0247631 A1* 11/2005 Queen ................... B01D 61/48
204/542

FOREIGN PATENT DOCUMENTS

| JP | 2004269288 A | * | 9/2004 |
| KR | 20170080918 A | | 7/2017 |
| WO | 2013011462 A2 | | 1/2013 |

OTHER PUBLICATIONS

JP2004269288A, machine translation, Sep. 30, 2004, pp. 1-4 (Year: 2004).*

(Continued)

*Primary Examiner* — Medhanit W Bahta
(74) *Attorney, Agent, or Firm* — Conley Rose, P.C.; Michael W. Piper; Andrew M. Metrailer

(57) ABSTRACT

The present invention provides a process for recovering glycol from a process stream comprising glycol, water, dissolved salts, and hydrocarbons. The process comprises subjecting the process stream to a salt-enrichment process to obtain a salt-enriched stream having a salt concentration higher than salt concentration of the process stream, and a salt-reduced stream; subjecting the salt-enriched stream to a glycol reclaiming process to separate the salts and at least a portion of the hydrocarbons from the salt enriched stream to obtain a substantially salt-free water-glycol stream; and blending the salt reduced stream from the salt-enrichment process with the substantially salt-free stream to produce a reclaimed water-glycol stream.

17 Claims, 8 Drawing Sheets

(51) Int. Cl.
  *B01D 3/10* (2006.01)
  *B01D 3/14* (2006.01)
  *B01D 61/42* (2006.01)
  *C02F 1/04* (2023.01)
  *C02F 1/06* (2023.01)
  *C02F 1/469* (2023.01)
  *C02F 101/34* (2006.01)
  *C02F 103/10* (2006.01)
  *C07C 29/84* (2006.01)
  *C09K 8/52* (2006.01)

(52) U.S. Cl.
  CPC ......... *B01D 61/422* (2013.01); *B01D 61/428* (2022.08); *C02F 1/046* (2013.01); *C02F 1/06* (2013.01); *C02F 1/4691* (2013.01); *C02F 1/4695* (2013.01); *C07C 29/84* (2013.01); *C09K 8/52* (2013.01); *C02F 2101/34* (2013.01); *C02F 2103/10* (2013.01); *C09K 2208/22* (2013.01)

(58) Field of Classification Search
  CPC .......... B01D 61/428; C02F 1/046; C02F 1/06; C02F 1/4691; C02F 1/4695; C02F 2101/34; C02F 2103/10; C02F 1/4693; C02F 2301/043; C09K 8/52; C09K 2208/22
  See application file for complete search history.

(56) References Cited

OTHER PUBLICATIONS

Foreign Communication from a Related Counterpart Application, International Search Report and Written Opinion dated Sep. 8, 2020, International Application No. PCT/CA2020/050812 filed on Jun. 12, 2020.

Foreign Communication from a Related Counterpart Application, International Preliminary Report on Patentability dated Sep. 23, 2021, International Application No. PCT/CA2020/050812 filed on Jun. 12, 2020.

* cited by examiner

PROCESS FOR RECOVERY OF HYDRATE INHIBITORS

CROSS-REFERENCE TO RELATED APPLICATIONS

The present application is a filing under 35 U.S.C. 371 as the National Stage of International Application No. PCT/CA2020/050812, filed Jun. 12, 2020, entitled "PROCESS FOR RECOVERY OF HYDRATE INHIBITORS," which claims priority to U.S. Provisional Application No. 62/861,568 filed with the United States Patent and Trademark Office on Jun. 14, 2019, both of which are incorporated herein by reference in their entirety for all purposes.

FIELD OF THE INVENTION

The present invention pertains to the field of recovery of hydrate inhibitors used in the oil & gas industry. In particular, recovery of a glycol from a process stream comprising glycol, water, dissolved salts, and hydrocarbons.

BACKGROUND OF THE INVENTION

Hydrate inhibitors such as mono-ethylene glycol (MEG) are added to a process stream comprising hydrocarbons (such as oil and gas production lines) to inhibit the formation of hydrates within the stream and assure fluid flow. A typical application is for long transport pipelines from offshore producers with tie-back to an onshore or offshore process plant.

Typically, a glycol (such as MEG) is injected into the flowlines of a production well as a "lean-glycol stream" (i.e. containing a low level of water, usually 5-40 wt % water). The lean-glycol stream mixes with the produced water (water produced along with the hydrocarbons in a produced stream), generating a rich-glycol stream (i.e. containing a high level of water, usually >40-wt %), and returns to the main processing facility. The rich-glycol steam returns to shore as a mixture of gas, hydrocarbons, produced water, salts and other solids. Glycols are recovered and reinjected into the flow lines of the production well to minimize the operating and environmental costs associated with replacement and disposal.

The produced water is removed via a regeneration process, bringing the glycol content back up to the desired lean glycol specification. The regenerated lean-glycol stream is re-injected into production flow lines to inhibit hydrate formation. This system is called a "flow assurance loop", which manages circulation of a glycol as hydrate inhibitor. A flow assurance loop can be defined as a part of "flow assurance system" ensuring that production is delivered from the wells to the downstream processing facility with a high level of availability.

The produced water comprises "condensed water" (i.e. the water that condenses as the hydrocarbons cool down), and "formation water" (i.e. the free water that is present in the reservoir). The presence of formation water introduces dissolved salts into the flow assurance loop. If left unchecked, these salts accumulate in the flow assurance loop, reaching their solubility limit, allowing salts to precipitate or form scale in the system, leading to equipment damage, reduced throughput, and reduced production.

One way of separating the dissolved salts from a glycol feed stream (i.e. reclaiming glycol) is by adding chemicals to form insoluble salts. For example, WO 2007/073204 discloses a process and a plant for regeneration of glycol from a mixture comprising glycol, water and salts, the salts comprising carbonate and/or bicarbonate ions. The mixture is flash distilled to obtain a salt-free solution of glycol and water. This solution is condensed and distilled to obtain glycol with reduced water content. The salts are concentrated in the vacuum boiler and removed from a sub-stream taken out of a return circuit to the vacuum boiler. Time and temperature of such a separation process must be strictly controlled. In addition, the process requires large and expensive equipment, as well as additional chemicals that are not inherently available as part of the glycol regeneration process. These chemicals must be obtained from outside sources which can be very expensive, particularly when delivered to offshore platforms in remote parts of the world. The chemicals would also require specialized handling/storage, and increase training, reporting, and record keeping protocols for safety concerns. In addition, proper disposal of the insoluble salts can be expensive, time-consuming, and labor-intensive, and even more difficult in offshore applications where temporary storage space and transportation to an approved disposal site are not readily available.

Another approach to avoid the accumulation of salts in the flow assurance loop, is the incorporation of glycol-reclaimers. Several technologies have been used to accomplish this goal, but vacuum distillation/flash separation has provided the most success, wherein glycol and lighter components are boiled off, leaving the salts as residue, along with high boiling tars and degradation materials. These processes are vast energy consumers and the equipment is very large because the system operates under vacuum.

The size of a reclaimer required for an effective reclamation process is a function of the salt load (salts to be removed) in kg/h and the salt concentration in the feed. In order to prevent accumulation of salt in the flow assurance loop, the salt removed by the "reclaimer" must meet or exceed the "salt incursion rate" (i.e. amount of salts that enter the flow assurance loop as formation water, which cannot normally be influenced without impacting hydrocarbon production).

The salt incursion rate generally increases over the lifetime of a production field with a maximum expected rate identified by reservoir engineers during the planning stage of a project.

KR 20170080918 discloses a glycol reclamation and regeneration process wherein reclaiming of glycol via "vacuum distillation/flash separator" is replaced with "electrolytic desalination process". The process of this reference involves subjecting the rich-glycol stream from the pipeline to a capacitive deionization (CDI) unit, wherein the rich-glycol stream is passed between electrodes, wherein the salts are adsorbed onto electrodes to generate a "desalted-glycol stream", from which produced water is removed via a "regenerator". The salts are then removed from the desalting unit and discharged to the outside. This reference does not provide any disclosure about how the salt is removed from the unit. As it is well known in the art that it is not possible to obtain and separate a salt in solid form from a capacitive deionization process, the separated salts can only be removed as an aqueous solution. Since the process of this reference involves discarding the salt stream, the process would result in substantial glycol loss.

Accordingly, there is a need for an improved process which can maximize glycol recovery and reduce capital and operating cost.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a process for the recovery of hydrate inhibitors from a process stream using deionization techniques. In accordance with an aspect of the present invention, there is provided a process for recovering glycol from a process stream comprising glycol, water, dissolved salts, and hydrocarbons. The process comprises subjecting the process stream to a salt enrichment process to obtain a salt-enriched stream and a salt-reduced stream; subjecting the salt-enriched stream to a glycol reclaiming process to separate the salts and at least a portion of the hydrocarbons from the salt enriched stream and obtaining a substantially salt-free water-glycol stream; and blending the salt reduced stream obtained in the salt-enrichment process with the substantially salt-free stream to produce a reclaimed water-glycol stream.

BRIEF DESCRIPTION OF THE FIGURES

The invention will now be described by way of an exemplary embodiment with reference to the accompanying simplified, diagrammatic, not-to-scale drawings. In the drawings.

Figure 1:
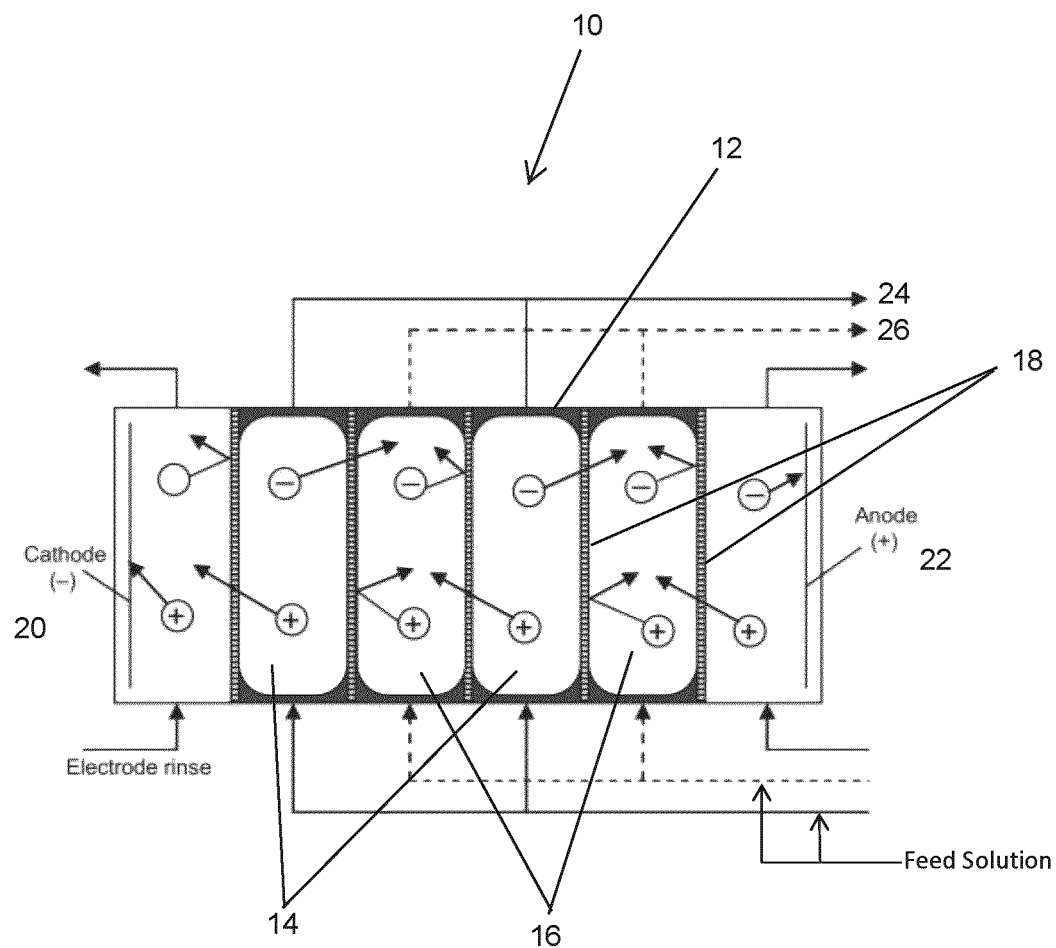
FIG. 1 is a schematic depiction of an electrodialysis process, known in the art, which can be utilized in the process for recovering a hydrate inhibitor in accordance with an embodiment of the present invention.

Unless defined otherwise, all technical and scientific terms used herein have the same meaning as commonly understood by one of ordinary skill in the art to which this invention belongs.

As used herein, the term "about" refers to a +/−10% variation from the nominal value. It is to be understood that such a variation is always included in a given value provided herein, whether or not it is specifically referred to.

As used herein, the term "reclaimer" refers to a system or an apparatus configured to primarily remove salts and at least a portion of hydrocarbons from a process stream.

As used herein, the term "glycol reclaimer" refers to a system or an apparatus configured to remove salts, other solid impurities, and at least a portion of residual hydrocarbons from a process stream comprising glycol to produce a water-glycol stream.

As used herein, the term "regenerator" refers to a system or apparatus configured to primarily remove water and hydrocarbons from a process stream.

As used herein, the term "glycol regenerator" refers to a system or an apparatus configured to remove water and residual hydrocarbons from a process stream comprising glycol to produce a lean-glycol stream.

As used herein, the term "rich-glycol" stream refers to a process stream comprising a glycol and water mixture, having water content more than 40 wt %.

As used herein, the term "lean-glycol" stream refers to a stream comprising a glycol and water mixture, having water content less than 40%.

As used herein, the term "substantially salt-free" refers to a salt concentration less than 1% by weight.

The present invention provides an improved process for recovering hydrate inhibitors, such as glycols, in particular MEG, from hydrocarbon process streams.

The present application has established that by installing a Salt Enrichment Process (SEP) in the glycol recovery system prior to feeding a glycol feed stream from a production flow line to a glycol-reclaimer unit, the salt concentration of the glycol stream entering the glycol-reclaimer unit can be increased to achieve a reduction in the reclaimer feed rate to reduce the size of the required reclaimer(s), thereby reducing capital and operating costs.

The present application has also established that by installing a Salt Enrichment Process (SEP) in the glycol recovery system, which takes a glycol feed stream and generates two product streams, i.e. a salt-reduced stream (dilute) containing less dissolved salt than the feed stream, and a salt-enriched stream (concentrate) containing more dissolved salt than the feed stream, and feeding the concentrate/salt-enriched stream (which is conventionally considered as a waste stream) to a reclaimer, rather than the salt-reduced stream (as conventionally done), the feed rate can be reduced, which in turn would reduce the size of the required reclaimer(s), thereby reducing capital and operating costs.

Implementation of the process of the present invention for newly built facilities would allow for size reduction of the required reclaimer(s) that in turn would provide a clear advantage in selling a smaller unit compared to units conventionally used in the industry. The smaller unit would also potentially have reduced operating costs (utilities, chemicals, etc.). Implementation of the process of the present invention for existing facilities would allow higher salt removal to be achieved (de-bottlenecking).

In accordance with an embodiment, the present invention provides a process for recovering glycol from a process stream. The process comprises subjecting a process stream comprising glycol, water, dissolved salts, and hydrocarbons, to a salt enrichment process to obtain a salt-enriched stream and a salt-reduced stream. The salt-enriched stream is subjected to a glycol reclaiming process to separate the salts, and at least a portion of the hydrocarbons from the salt enriched stream to obtain a substantially salt-free water-glycol stream. The salt-reduced stream produced during the salt enrichment process can be blended with the substantially salt-free stream to produce a reclaimed water-glycol stream.

In some embodiments, the reclaimed water-glycol stream can be subjected to a glycol regeneration process to remove water and remaining hydrocarbons to produce a regenerated lean-glycol stream for re-injection into the production flow lines to inhibit hydrate formation.

In the salt-enrichment process, the salt concentration is manipulated such that the salt concentration of the salt-enriched stream is higher than the salt concentration in the process stream, and the salt concentration of the salt-reduced stream is lower than the salt concentration in the process stream.

The high salt concentration of the salt-enriched stream is then used to achieve a reduced reclaimer feed rate based on the salt incursion rate from the producing wells.

The process can be used to recover glycol from a process stream comprising from 1-95% glycol.

In some embodiments, the process stream comprises a rich-glycol stream having water content about 50 wt %. In some embodiments, the rich-glycol stream has water content more than 60 wt %. In some embodiments, the rich-glycol stream has water content more than 70 wt %.

In some embodiments, the process stream comprises a lean-glycol stream having glycol content more than 60 wt % and water content less than 40%. In some embodiments, the lean-glycol stream has glycol content more than 70 wt % and water content less than 30%.

In some embodiments, the process stream comprises a lean-glycol stream having glycol content more than 75 wt %. In some embodiments, the lean-glycol stream has glycol content about 75 to 95 wt %.

In some embodiments, the process of the present invention comprises subjecting the salt-enriched stream obtained from the salt enrichment process to an integrated glycol reclaiming and glycol regenerating process to separate the salts, hydrocarbons and water to produce a substantially salt-free lean glycol stream.

In some embodiments, at least a portion of the salt-reduced stream obtained from the salt enrichment process is subjected to a glycol regenerating process to remove water and residual hydrocarbons to obtain a lean salt-reduced glycol stream. The lean salt-reduced glycol stream can be blended with a substantially salt-free lean glycol stream to produce a regenerated lean-glycol stream for use in a flow assurance loop.

In some embodiments, the process comprises subjecting the process stream comprising glycol, water, dissolved salts, and hydrocarbons to a glycol regeneration process prior to subjecting the process stream to the salt enrichment process, to remove water and at least a portion of the hydrocarbons, to obtain a lean salt-glycol stream. In such embodiments, the lean salt-glycol stream is subjected to the salt enrichment process to obtain a salt-enriched lean glycol stream and a salt-reduced lean glycol stream. The salt-enriched lean glycol stream is then subjected to the glycol reclaiming process to separate the salts and remaining hydrocarbons to produce a substantially salt-free lean glycol stream. The lean salt-reduced stream can then be blended with the substantially salt-free lean glycol stream to produce a reclaimed lean glycol stream for re-injection into the production flow lines to inhibit hydrate formation.

The salt-enrichment process can involve any one of the known electro-separation and/or deionization techniques.

In some embodiments, the salt-enrichment process comprises an electrodialysis reversal (EDR) process. In some embodiments, the salt-enrichment process comprises a capacitive deionization process ("CDI"). In some embodiments, the salt enrichment process comprises a continuous electrodeionization process ("CEDI").

In some embodiments, wherein the salt-enrichment process involves electro-separation and/or deionization techniques, the salt concentration can be manipulated by varying the voltage/current applied to the separation/deionization module, and/or by varying the flow split of the feed stream entering different compartments/sections (i.e. diluting and concentrating compartments) of the module.

In some embodiments, the salt-enrichment process can also include chemical injection.

The glycol reclaiming process can involve any one of the known reclaiming apparatus/systems and techniques, such as flash separator apparatus or system(s), distillation apparatus/system(s) that may operate under vacuum, etc. In some embodiments, the glycol reclaiming process can involve a desanding hydrocyclone or a centrifugal apparatus/system.

The glycol regeneration process can involve any one of the known regenerating apparatus/systems and techniques, such as flash separator apparatus/system, vacuum distillation apparatus/system, etc.

To gain a better understanding of the invention described herein, the following examples are set forth. It will be understood that these examples are intended to describe illustrative embodiments of the invention and are not intended to limit the scope of the invention in any way.

FIG. 1 is a schematic depiction of a electrodialysis process (10) known in the art that is used to transport salt ions from one solution through ion-selective membranes to another solution under the influence of an applied electric potential difference in a electrodialysis cell (12), comprising one or more diluting compartments (14), and one or more concentrating compartments (16) formed by alternating anion and cation selective membranes (18) placed between two oppositely charged electrodes (20, 22). In most practical electrodialysis processes, multiple electrodialysis cells are arranged into a configuration called an electrodialysis stack, with alternating anion and cation exchange membranes forming the multiple electrodialysis cells. Given the conservation of mass, if dissolved salts are removed from one stream, they must be added to another stream. Therefore, application of this technology always takes a lean or rich-glycol stream containing dissolved salts, and generates a dilute (salt-reduced) lean or rich-glycol stream (24) and a concentrated (salt-enriched) lean or rich-glycol stream (26).

Figure 2:
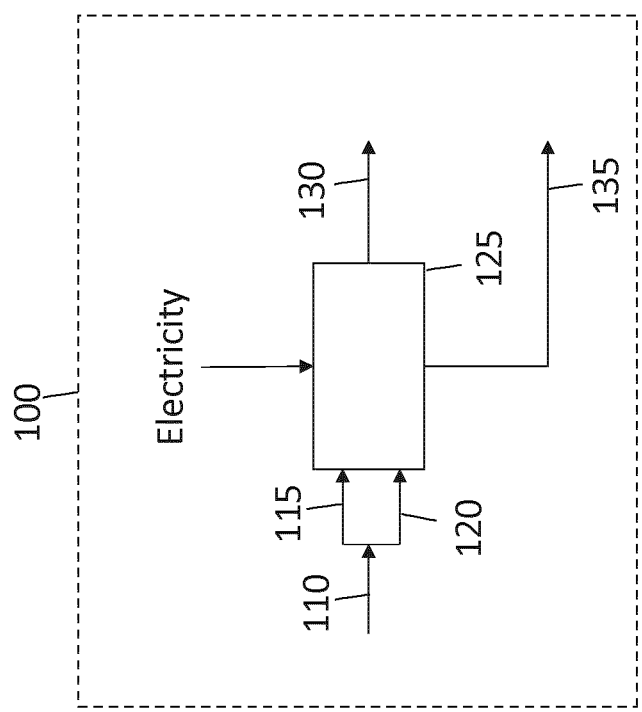
FIG. 2 is a schematic depiction of a salt enrichment process for recovering a hydrate inhibitor in accordance with an embodiment of the present invention.

FIG. 2 is a schematic depiction of an example of a salt enrichment process (100) involving electrodialysis, which can be utilized in the process for recovering a glycol in accordance with an embodiment of the present invention.

In this example, an aqueous process stream comprising glycol and dissolved salts (110) is split into two separate feed streams, for example, a dilute feed stream (115) being fed to a diluting compartment of an electrodialysis cell/module and a concentrated feed stream (120) being fed to a concentrating compartment of the electrodialysis cell/module. The dilute and concentrated feed streams (115) and (120) enter an electrodialysis module (125). An electrical charge is applied, causing cations and anions to be transferred, creating a dilute/salt-reduced product stream (130) and a concentrated/salt-enriched product stream (135), such that the concentrated/salt-enriched product stream (135) contains more dissolved salt than the feed stream (110), and the dilute/salt-reduced product stream (130) contains less dissolved salt than the feed stream (110).

Figure 3:
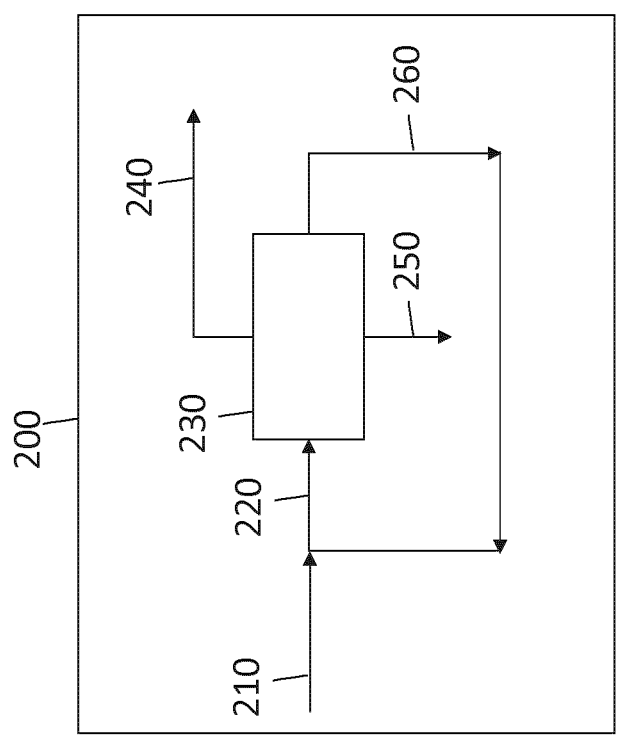
FIG. 3 is a schematic depiction of a flow-assurance loop of the process for recovering a hydrate inhibitor in accordance with an embodiment of the present invention.

FIG. 3 is a schematic depiction of flow-assurance loop (200) of the process for recovering a glycol in accordance with an exemplary embodiment of the present invention.

A lean-mono ethanol glycol (MEG) stream (260), which may contain 60-95% MEG by weight in water, is blended with a process stream produced from one or more hydrocarbon producing wells. The process stream (210) that enters the system may contain hydrocarbons, produced water, and dissolved salts. In order to maintain steady state operation of the flow assurance loop, any water and dissolved salts from the process stream (210) must be removed. This is achieved in a MEG recovery process (230), which removes water (240) and salt (250) while regenerating the lean-MEG (260) for reuse in the loop. The lean-MEG (260) is blended with the process stream (210), resulting in a rich-MEG stream (220).

Figure 4:
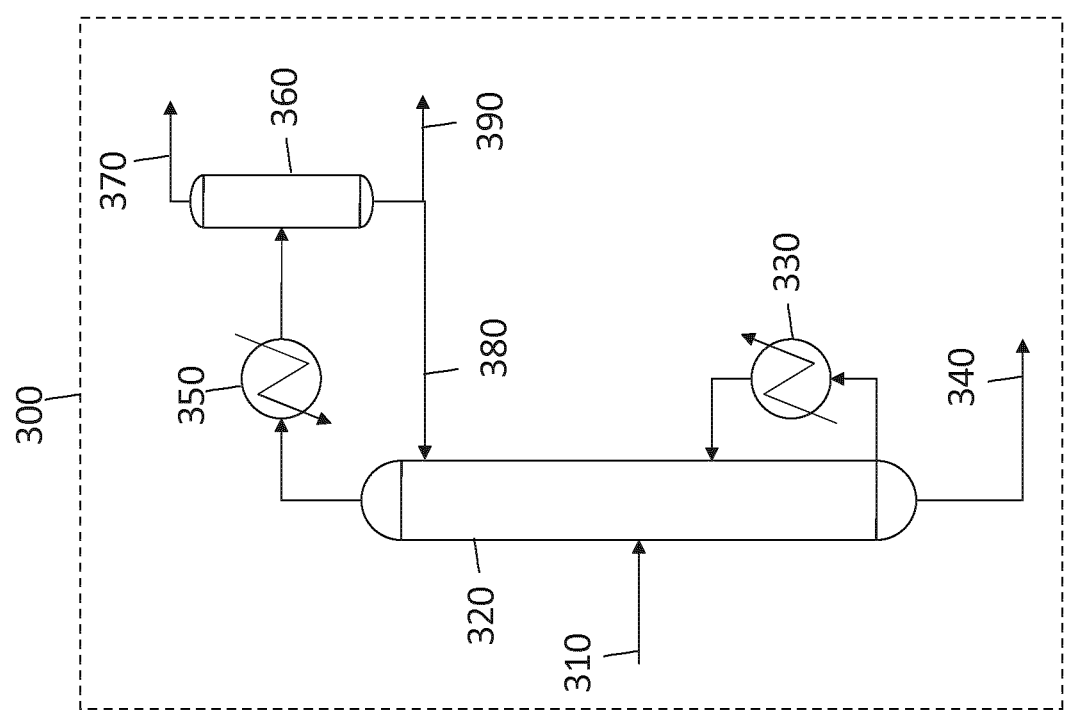
FIG. 4 is a schematic depiction of a "regenerator" used in the process for recovering a hydrate inhibitor in accordance with an embodiment of the present invention.

FIG. 4 is a schematic depiction of an exemplary glycol regenerating system (300) used in the process for recovering a glycol in accordance with an embodiment of the present invention.

A rich-MEG process stream (310) is fed to the fractionation column (320). Heat is added to the column via the reboiler (330) converting the water in the rich-MEG stream to steam, which travels up the column. With the water removed from the incoming rich-MEG stream (310), a lean-MEG stream (340) is removed from the bottom of the column. This lean-MEG stream (340) contains less water than the incoming rich-MEG stream (310). The steam that exits the top of the column is condensed via the condenser (350) and is separated from any non-condensable vapors (370) in the reflux drum (360). The condensed water is split into two streams with a portion directed back to the column (320) as reflux water (380) while the rest of the condensed water is removed from the process as produced water (390).

Figure 5:
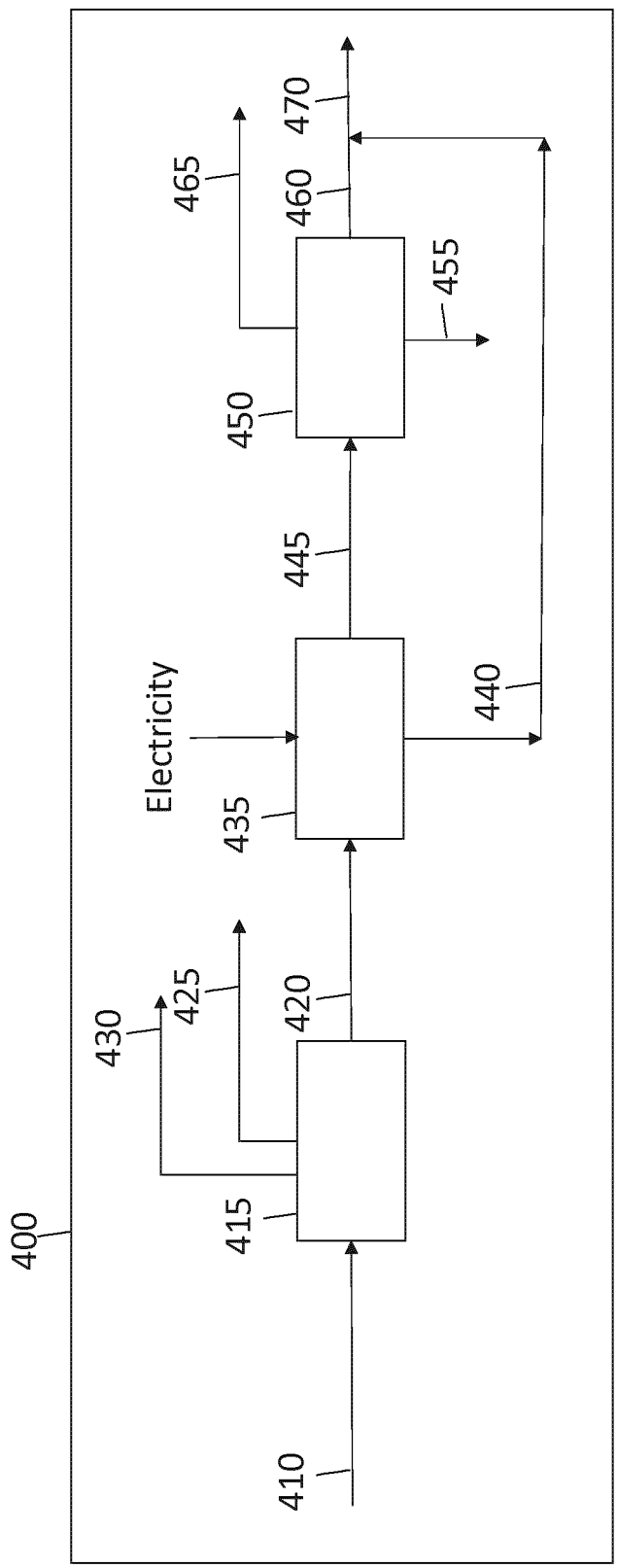
FIG. 5 is a schematic depiction of the process for recovering a hydrate inhibitor in accordance with an embodiment of the present invention.

FIG. 5 is a schematic depiction of the process for recovering a glycol in accordance with an embodiment of the present invention, involving a Glycol Regenerator with a Lean-Glycol Reclaimer, and Salt Enrichment Process (400).

A rich-MEG stream (410) is fed to a MEG Regenerator system (415). Water and dissolved hydrocarbons are removed from the incoming rich-MEG stream (410) generating a salty lean-MEG stream (420). The water that is removed exits as a produced water stream (425) while any liberated hydrocarbons are removed via stream (430). The salty lean-MEG stream (420) contains dissolved salts that need to be removed using a reclaiming process.

The salty lean-MEG stream (420) is subjected to a salt-enrichment process in processing unit (435), to generate a concentrated/salt-enriched lean-MEG stream (445) and a dilute/salt-reduced lean-MEG stream (440), such that the salt concentration in stream (445) is higher than the salt concentration in stream (420). The flow rate of the stream (445) for a suitable reclaimer to be used is defined/set by taking the salt incursion rate from the producing well and dividing it by the salt concentration in stream (445), which is manipulated during the salt-enrichment process.

The MEG reclaimer system (450) is then used to separate the dissolved salts from the salt-enriched lean-MEG stream (445), which generates a desalted/substantially salt-free lean-MEG stream (460). The salts separated from the reclaimer feed (445) can be removed from the reclaimer system as a salt stream (455). This stream may be in solid form or may be blended with water to generate brine. Any dissolved hydrocarbons present in the reclaimer feed (445) are removed and directed out of the reclaimer system via stream 465. The desalted lean-MEG stream (460) recovered via the process is suitable for use in the flow assurance loop.

In some instances, some level of dissolved salts is acceptable in the lean-MEG stream. In some embodiments, the salt concentration and flow rates of the dilute/salt-reduced lean-MEG stream (440) and the concentrated/salt enriched lean-MEG stream (445) are manipulated, and the lean-MEG bypass stream (440) is mixed with desalted lean-MEG stream (460) to form a recovered lean-MEG stream (470) suitable for use in the flow assurance loop.

Figure 6:
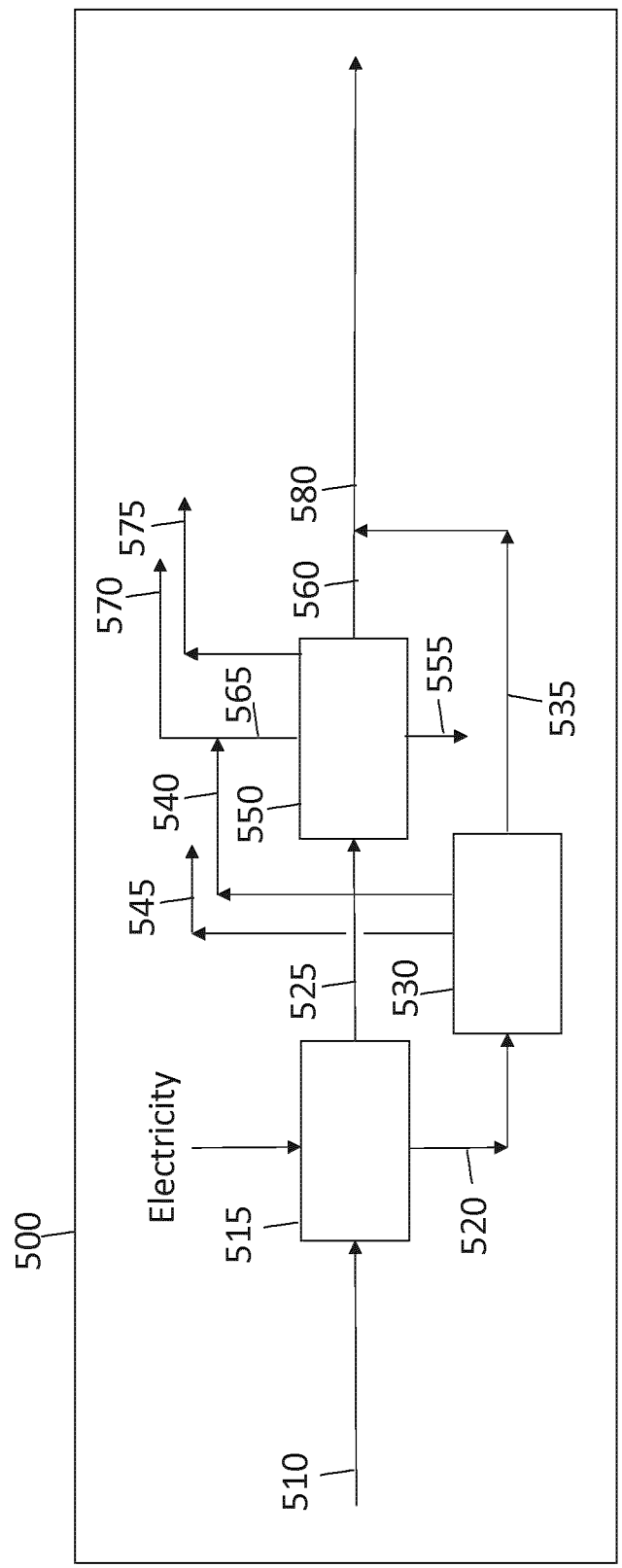
FIG. 6 is a schematic depiction of the process for recovering a hydrate inhibitor in accordance with an embodiment of the present invention.

FIG. 6 is a schematic depiction of the process for recovering a glycol in accordance with an embodiment of the present invention which involves integrated MEG Regenerator/Reclaimer with Salt Enrichment Process (500).

A rich-MEG process stream (510) is subjected to the salt-enrichment process in a processing unit (515), to generate a concentrated/salt-enriched rich MEG stream (525) and a dilute/salt-reduced rich-MEG stream (520). The salt concentration is manipulated such that the salt concentration in stream (525) is higher than the salt concentration in stream (510).

The dilute rich-MEG stream (520) is fed to MEG Regenerator system (530). Water and dissolved hydrocarbons are removed from the incoming dilute rich-MEG stream (520) generating a dilute lean-MEG stream (535). The water that is removed within the process exits as a produced water stream (540) while any liberated hydrocarbons are removed via stream (545).

The flow rate of stream (525) for a suitable reclaimer to be used is defined/set by taking the salt incursion rate from the producing wells and dividing it by the salt concentration in stream (525) which is manipulated during the salt-enrichment process.

The concentrated rich-MEG stream (525) is fed to the integrated MEG regenerator/reclaimer system (550). Water and dissolved hydrocarbons are removed from the incoming rich-MEG stream (525) generating a produced water stream (565) while any liberated hydrocarbons are removed via stream (575), and a desalted lean-MEG stream (560) is recovered. The salts removed from the feed stream (525) exit the process as a salt stream (555). This stream may be in solid form or may be blended with water to generate brine. In some circumstances, the produced water stream (570) is blended with salt stream (555) to form brine.

The desalted lean-MEG stream (560) is blended with the dilute lean-MEG stream (535), resulting in a lean-MEG stream (580) suitable for use in the flow assurance loop.

Figure 7:
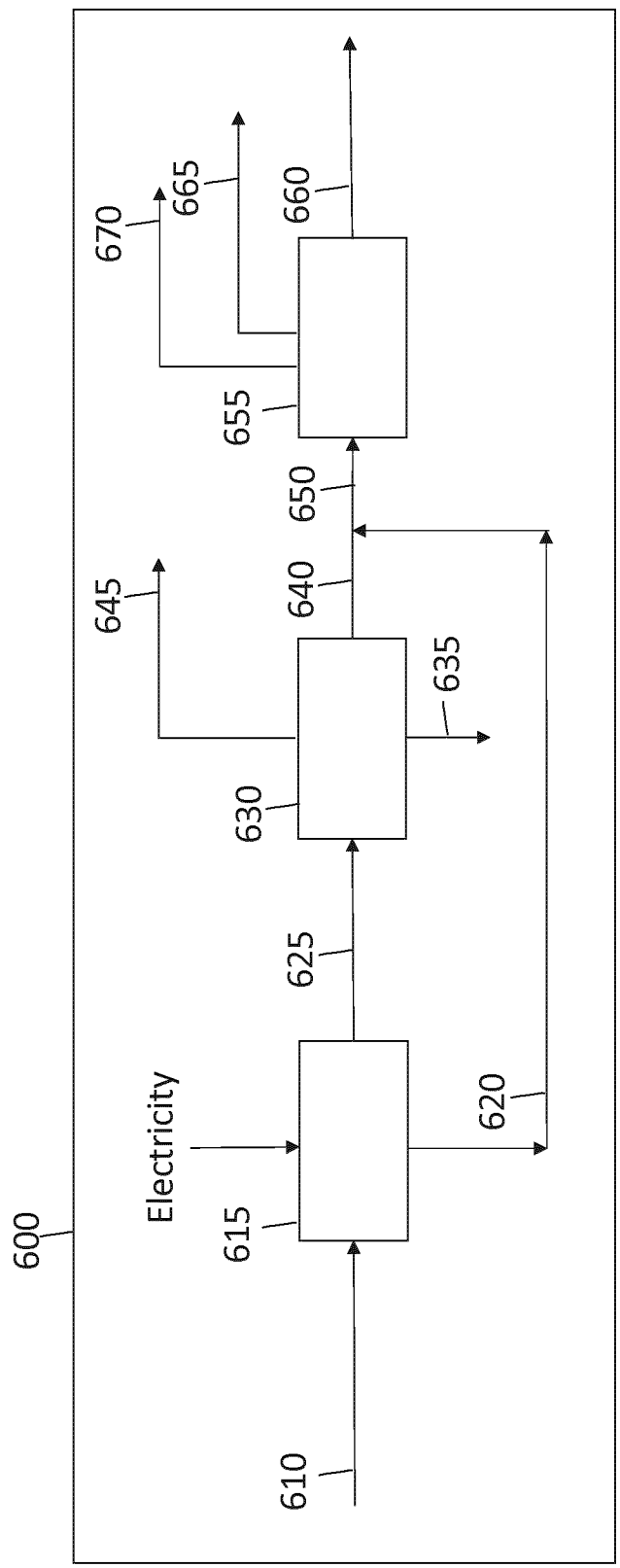
FIG. 7 is a schematic depiction of the process for recovering a hydrate inhibitor in accordance with an embodiment of the present invention.

FIG. 7 is a schematic depiction of another example of the process for recovering a glycol in accordance with an embodiment of the present invention involving a Rich-MEG Reclaimer with MEG Regenerator and Salt Enrichment Process (600).

A rich-MEG process stream (610) is subjected to a salt-enrichment process in processing unit (615), to generate a concentrated/salt-enriched stream (625) and a dilute/salt-reduced stream (620), wherein the salt concentration in stream (625) is higher than the salt concentration in stream (610). The flow rate of the salt-enriched stream (625) for a suitable reclaimer to be used is then defined/set by taking the salt incursion rate from the producing wells and dividing it by the salt concentration in salt-enriched stream (625), which is manipulated during the salt-enrichment process.

The salt-enriched rich-MEG stream (625) is subjected to a reclaiming process in the reclaimer system (630), wherein dissolved salts from the salt-enriched rich-MEG stream (625) are removed to generate a desalted/substantially salt-free rich-MEG stream (640). The salts removed from the salt-enriched rich-MEG stream (625) exit the reclaimer system as a salt stream (635). This stream may be in solid form or may be blended with water to generate brine. Any dissolved hydrocarbons present in the salt-enriched rich-MEG stream (625) are removed and directed out of the reclaimer via stream (645). The desalted rich-MEG stream (640) is then blended with the dilute rich-MEG stream (620), forming a partially-desalted rich-MEG stream (650). This stream is then directed to a MEG regeneration process (655).

Water and dissolved hydrocarbons are removed from the incoming partially-desalted rich-MEG stream (650) generating a lean-MEG stream (660). The water that is removed within the process exits as a produced water stream (665) while any liberated hydrocarbons are removed via stream (670). The lean-MEG stream (660) is suitable for use in the flow assurance loop.

Figure 8:
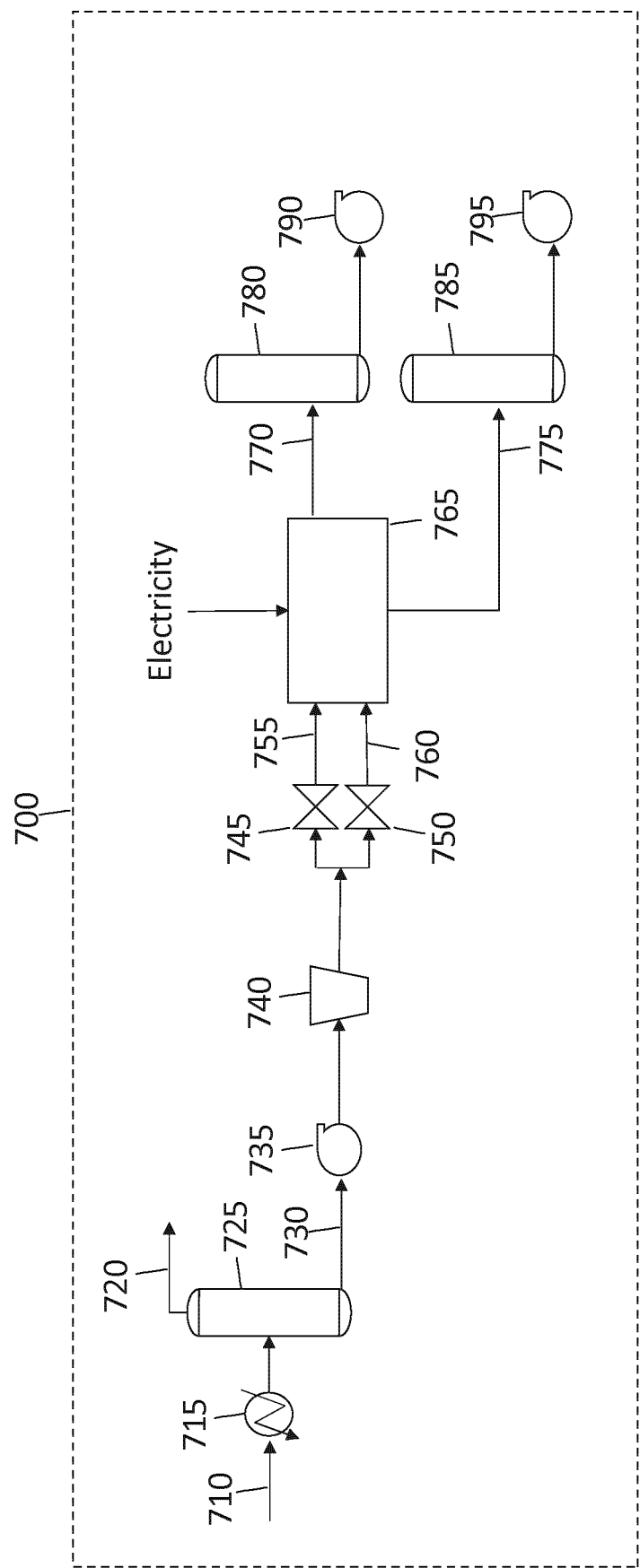
FIG. 8 is a schematic detailed depiction of the salt enrichment process for recovering a hydrate inhibitor in accordance with an embodiment of the present invention.

FIG. 8 is a schematic depiction of the salt enrichment process (700) for recovering a hydrate inhibitor in accordance with another embodiment of the present invention.

In this example, a process feed stream (710) is passed through a degassing vessel (725) to remove dissolved gases as stream (720), to obtain an aqueous feed stream (730) comprising glycol and dissolved salts. Temperature control for the degassing process is achieved via inlet heater/cooler (715).

The aqueous feed stream (730) is passed through the inlet filtration unit/system (740) using a feed pump (735). After filtration, the stream (730) is divided into two or more streams to be fed to one or more diluting compartments of an electrodialysis cell/module and one or more concentrating compartments of the electrodialysis cell/module (765).

In this example, the feed stream (730) after filtration is divided into a dilute feed stream (755) being fed to a diluting compartment of the electrodialysis cell/module and a concentrate feed stream (760) being fed to a concentrating compartment of the electrodialysis cell/module (765). The flow rates of the dilute and concentrated feed streams (755 and 760) are controlled via respective control valves (745 and 750). The dilute and concentrated feed streams enter the electrodialysis module (765). An electrical charge is applied, causing cations and anions to be transferred, creating a dilute/salt-reduced product stream (770) and a concentrated/salt-enriched product stream (775), such that the concentrated/salt-enriched product stream (775) contains more dissolved salt than the feed stream (730). The dilute product stream (770) is received in dilute stream surge tank (780) and recovered via transfer pump (790), and the concentrated product stream (775) is received in concentrate stream surge tank (785) and recovered via transfer pump (795).

As discussed above, the process of the present invention will reduce the energy consumption and size of glycol reclaimers. It would improve the operation of existing plants and reduce the size and cost of new plants. This process could be applied to the inlet of any existing glycol reclaimers to save energy and reduce the required feed rate.

Although the invention has been described with reference to certain specific embodiments, various modifications thereof will be apparent to those skilled in the art without departing from the spirit and scope of the invention. All such modifications as would be apparent to one skilled in the art are intended to be included within the scope of the following claims.

The invention claimed is:

1. A process for recovering glycol from a process stream comprising glycol, water, dissolved salts, and hydrocarbons, the process comprising:
   a) subjecting the process stream to a salt-enrichment process to obtain a salt-enriched stream having a salt concentration higher than a salt concentration of the process stream, and a salt-reduced stream, wherein the salt-enrichment process comprises an electro-separation process and/or a deionization process;
   b) subjecting the salt-enriched stream to a glycol reclaiming process to separate the salts and at least a portion of the hydrocarbons from the salt-enriched stream to obtain a substantially salt-free water-glycol stream; and
   c) blending the salt-reduced stream from step a) with the substantially salt-free water-glycol stream to produce a reclaimed water-glycol stream.

2. The process of claim 1, further comprising subjecting the reclaimed water-glycol stream to a glycol regeneration process to remove water and remaining hydrocarbons to produce a recovered lean-glycol stream suitable for re-introduction into the process stream.

3. The process of claim 1, wherein the glycol reclaiming process is integrated with a glycol regeneration process to separate the salts, hydrocarbons, and water to produce a substantially salt-free lean-glycol stream.

4. The process of claim 1, wherein the process comprises subjecting the process stream to a glycol regeneration process prior to step a) to remove water and at least a portion of the hydrocarbons, to obtain a salty lean-glycol stream, wherein:
   the step a) comprises subjecting the salty lean-glycol stream to the salt-enrichment process to obtain a salt-enriched lean-glycol stream and a salt-reduced lean-glycol stream; and
   the step b) comprises passing the salt-enriched lean-glycol stream to the glycol reclaiming process to separate the salts and remaining hydrocarbons to produce a substantially salt-free lean-glycol stream.

5. The process of claim 4, further comprising blending the salt-reduced lean-glycol stream from step a) with the substantially salt-free lean-glycol stream to produce a recovered lean-glycol stream for re-introduction into the process stream.

6. The process of claim 1, wherein the glycol reclaiming process involves a flash separation and/or a vacuum distillation.

7. The process of claim 2, wherein the glycol regeneration process involves a flash separation and/or a distillation optionally under vacuum.

8. The process of claim 1, wherein the salt-enrichment process is electrodialysis reversal (EDR).

9. The process of claim 1, wherein the salt-enrichment process is capacitive deionization (CDI).

10. The process of claim 1, wherein the salt-enrichment process is continuous electrodeionization (CEDI).

11. The process of claim 1, wherein the glycol is mono ethylene glycol (MEG).

12. A system for recovering glycol from a process stream comprising glycol, water, dissolved salts, and hydrocarbons, the system comprising:
   a salt-enrichment unit configured to obtain a salt-enriched stream via a salt-enrichment process having a salt concentration higher than a salt concentration of the process stream, and obtain a salt-reduced stream, wherein the salt-enrichment process comprises an electro-separation process and/or a deionization process, and the salt-enrichment unit comprises a continuous electrodeionization (CEDI) unit;
   a glycol reclaimer unit configured to receive the salt-enriched stream and separate the salts and at least a portion of the hydrocarbons from the salt-enriched stream to obtain a substantially salt-free water-glycol stream; and
   a glycol regeneration unit configured to receive a reclaimed water-glycol stream and remove water and any remaining hydrocarbons to produce a recovered lean-glycol stream suitable for re-introduction into the process stream, wherein the reclaimed water-glycol stream comprises the salt-reduced stream blended with the substantially salt-free water-glycol stream.

13. The system of claim 12, wherein the glycol reclaimer unit is integrated with the glycol regeneration unit to form an integrated unit, where the integrated unit is configured to separate the salts, hydrocarbons, and water to produce a substantially salt-free lean-glycol stream.

14. The system of claim 13, wherein the glycol regeneration unit is configured to receive at least a portion of the salt-reduced stream and remove water and hydrocarbons to obtain a salt-reduced lean-glycol stream, wherein the recovered lean-glycol stream for re-introduction into the process stream comprises the salt-reduced lean-glycol stream blended with the substantially salt-free lean-glycol stream.

15. The system of claim 12, wherein the glycol reclaimer unit comprises a flash separation and/or a vacuum distillation.

16. The system of claim 12, wherein the glycol regeneration unit comprises a flash separation and/or a distillation optionally under vacuum.

17. The system of claim 12, wherein the glycol is monoethylene glycol (MEG).

* * * * *